United States Patent [19]

Freshour et al.

[11] 3,853,271

[45] Dec. 10, 1974

[54] FLUID DISCHARGE SYSTEM

[75] Inventors: Kenneth D. Freshour, Norman, Okla.; John C. Van Dyk, deceased, late of Oklahoma City, Okla. by Liberty National Bank & Trust Co., trustee

[73] Assignee: Woods Research & Development Corp., Oklahoma City, Okla.

[22] Filed: Oct. 2, 1972

[21] Appl. No.: 293,775

Related U.S. Application Data

[60] Division of Ser. No. 113,608, Feb. 8, 1971, Pat. No. 3,724,762, which is a continuation of Ser. No. 814,716, Oct. 23, 1970, abandoned.

[52] U.S. Cl.............. 239/8, 261/116, 261/DIG. 43, 261/DIG. 75
[51] Int. Cl............................................ B05b 17/04
[58] Field of Search............ 239/427.3, 427.5, 428.5, 239/22, 23, 8, 9, 10; 261/DIG. 43, DIG. 75, 116, 119

[56] References Cited
UNITED STATES PATENTS

| | | | |
|---|---|---|---|
| 366,169 | 7/1887 | Hyatt | 239/428.5 UX |
| 992,081 | 5/1911 | Tait | 261/116 UX |
| 992,181 | 5/1911 | Foss | 239/427.3 |
| 2,681,830 | 6/1954 | Peterman | 239/428.5 UX |
| 2,985,384 | 5/1961 | Martin | 239/428.5 X |

FOREIGN PATENTS OR APPLICATIONS

| | | | |
|---|---|---|---|
| 468,687 | 7/1937 | Great Britain | 239/428.5 |

*Primary Examiner*—M. Henson Wood, Jr.
*Assistant Examiner*—John J. Love
*Attorney, Agent, or Firm*—Richards, Harris & Medlock

[57] ABSTRACT

A fluid discharge system for use both as a nozzle and as a fluid oxidizer. The system includes a plurality of identical cup-shaped converging members positioned at equally spaced points. A stream of water is directed through all of the converging members and is discharged from the last member. Each converging member acts as a ventrui to add air to the water. The air oxidizes impurities in the water and increases the discharge distance of the stream.

10 Claims, 2 Drawing Figures

FLUID DISCHARGE SYSTEM

This is a divisional application of Ser. No. 113,608 filed Feb. 8, 1971, now issued as U.S. Pat. No. 3,724,762, which is a continuation of Ser. No. 814,716 filed Oct. 23, 1970 now abandoned.

BACKGROUND OF THE INVENTION

The object of many fluid discharge systems, such as fire hose nozzles, garden sprayers and the like, is to increase the discharge distance of the fluid. Other systems promote oxidation or other chemical reactions involving the fluid by causing turbulence and dispersion of the fluid. In the past, all such systems have basically been comprised of a single convergent section located at the point of discharge of the fluid. Convergent sections tend to increase the discharge velocity of fluids which in turn increases discharge distance. Convergent sections also tend to increase the discharge turbulence of fluids which in turn causes the fluid to tend to disperse.

In accordance with the present invention, a fluid is directed through a plurality of convergent sections each open to the atmosphere. Each convergent section acts as a venturi to draw air into the fluid. This promotes oxidation of the fluid. The addition of the air to the fluid also increases the discharge distance of the fluid.

SUMMARY OF INVENTION CLAIMED

In the preferred embodiment, this invention comprises a plurality of fluid adding members positioned at spaced points along a fluid stream. Preferably, the adding members are cup-shaped venturi forming members positioned at intervals adjacent the point of discharge of the fluid.

BRIEF DESCRIPTION OF THE DRAWINGS

A more complete understanding of the invention may be had by referring to the following detailed description when taken in conjunction with the drawings, wherein.

DETAILED DESCRIPTION

Figure 2:
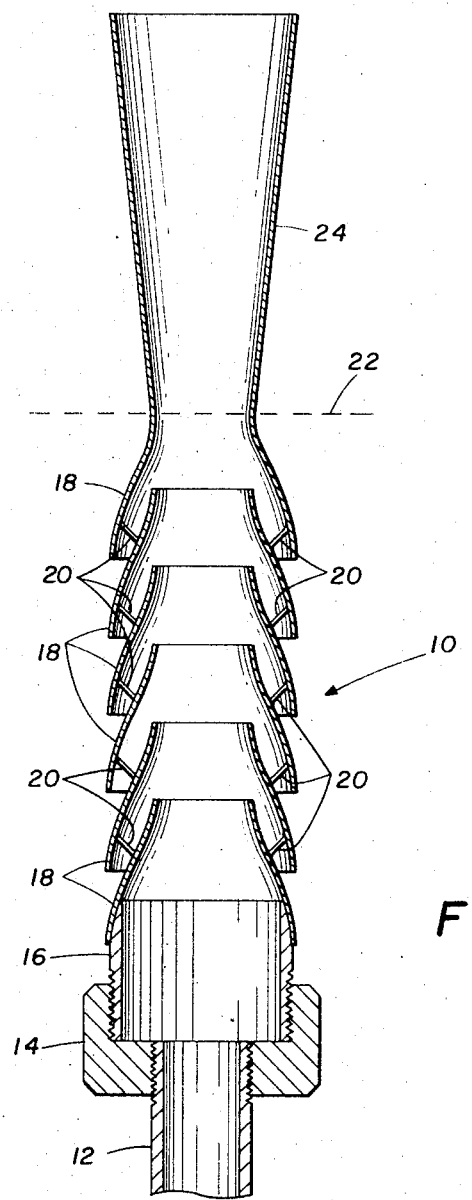
FIG. 2 is an enlarged sectional view of a portion of the device shown in FIG. 1.

Referring now to the drawings, and particularly to FIG. 2, there is shown a fluid discharge system 10 employing the invention. The system 10 is mounted on a pipe 12 which extends from a source of fluid under pressure (not shown) such as an ordinary water pump. The system 10 is secured to the pipe 12 by a reducing coupling 14 and comprises a large diameter end member 16 and a plurality of identical cup-shaped converging sections 18. The first cup-shaped section 18 is secured directly to the large diameter member 16. The remainder of the cup-shaped sections 18 are secured in spaced relation to each other by a plurality of pins 20. The pins 20 extend from the small end of each cup-shaped section 18 to the large end of the next adjacent section 18 and are randomly spaced so that the interior of the fluid discharge system 10 is open to the atmosphere.

The fluid discharge system 10 may be used both as a nozzle and as a fluid oxidizer. When the system 10 is used as a nozzle, the cup-shaped section 18 remote from the member 16 has the same shape as the other cup-shaped members 18. That is, the endmost cup-shaped section 18 is terminated at a point indicated by the dash line 22 in FIG. 2. When water or any other fluid is forced through such a nozzle, each cup-shaped section 18 after the section 18 that is attached to the member 16 acts as a venturi. Because the interior of the system 10 is open to the atmosphere, the venturi effect of the sections 18 adds air to the moving fluid stream. The addition of air to the stream as it is discharged greatly increases the discharge distance of the stream.

By way of example, a nozzle of the type shown in FIG. 2 was constructed from identical cup-shaped converging sections each having a total length of 32 millimeters, a large diameter opening of 40 millimeters and a small diameter opening of 20 millimeters. The nozzle was assembled with the end of each section separated from the same end of the next adjacent section by 17 millimeters. When water pressurized to forty pounds per square inch was supplied to the nozzle, the following results were obtained:

|  | Discharge Distance |
| --- | --- |
| pipe alone | 20' |
| one cup, no venturi | 30' |
| 1 stage venturi | 35' |
| 3 stage | 50' |
| 6 stage | 50-60' |
| 9 stage | 40' |

The addition of the large diameter member 16 and the first cup-shaped section 18 to the basic pipe is equivalent to adding a conventional nozzle. This is because the first cup-shaped section 18 is a simple converging section and has no venturi effect. The result of adding a plurality of venturi sections to a basic nozzle is demonstrated by the increase in discharge distance resulting from the use of three and six venturi stages. The use of six venturi stages substantially triples the discharge distance from a basic pipe and doubles the discharge distance from a simple converging section.

Figure 1:
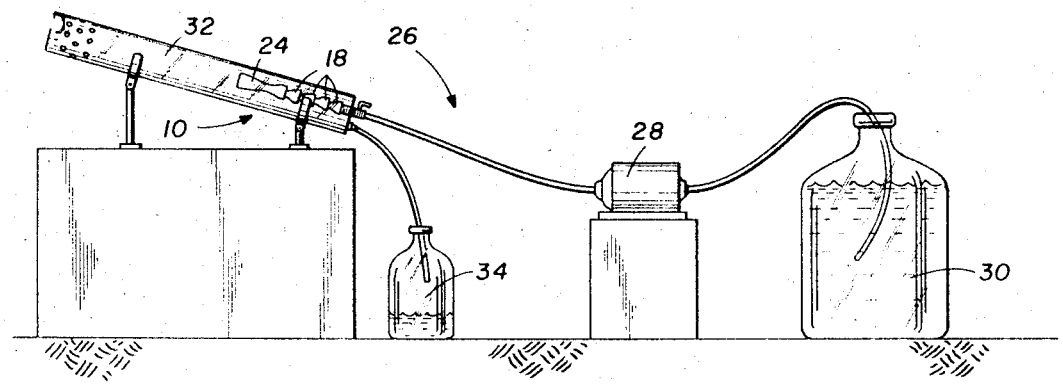
FIG. 1 is a front view of a fluid oxidizing system employing the invention.

When the system 10 is used as a fluid oxidizer, a divergent section 24 is added to the end of the endmost cup-shaped section 18 in the manner shown in FIG. 2. A fluid oxidizing system 26 employing a fluid discharge system 10 so constructed is shown in FIG. 1. The fluid oxidizing system 26 includes a pump 28 which forces fluid from a fluid supply tank 30 through a fluid discharge system positioned within a casing 32. Fluid discharged from the fluid discharge system 10 collects on the walls of the casing 32 and drains into a collection tank 34.

The performance of the system 26 as a fluid oxidizer was tested using water obtained from Sulphur, Okla. Before oxidation, such water was found to contain 63 parts per million sulphur. After the water was oxidized by the system 26, the water was found to contain 14.3 parts per million sulphur. Thus, use of the oxidizing system 26 resulted in a reduction of the sulphur content of the water by approximately 78 percent.

Of course, the fluid discharge system according to the present invention is not limited to use as a nozzle or as a fluid oxidizer but may be used in any desired manner. Also, the system is not limited to devices having the sizes described but may be of any desired size and may be formed from any desired material. Thus, although only one embodiment and only two uses of the invention are shown in the drawings and described in the foregoing specification, it will be understood that the invention is not limited to the embodiment and uses described, but is capable of rearrangement, modification and substitution of parts and elements without departing from the spirit of the invention.

What is claimed is:

1. A liquid-gas contacting process comprising:

forcing a stream of liquid of predetermined cross-section through a series of convergent sections each open to a predetermined gaseous atmosphere and convergent sections having convergent ends equal in cross-section thereby entraining the gas in the liquid stream, and spraying the liquid and the gas entrained therein out of the last convergent section in the series into the same predetermined atmosphere whereby the liquid and the gas will free-fall to reduce separation due to gravity and thus tend to increase the time of liquid-gas contact.

2. The liquid gas contacting process according to claim 1 wherein the forcing step is further characterized by forcing the liquid through a plurality of cup-shaped sections each of which convergingly tapers in the direction of movement of the liquid in a manner to increase the discharge distance, and wherein the liquid and gas are sprayed outwardly to prolong the freefall state of the liquid and gas and thereby retard separation due to the effects of gravity.

3. The liquid-gas contacting process according to claim 1 further characterized by:

forcing water through convergent sections that are open to an atmosphere of air, and discharging the resulting water-air mixture directly into the air.

4. A method of aerating water including the steps of:

forcing a stream of water under pressure through a series of converging sections each having converging ends identical in cross-section, and each open to the atmosphere and thereby entraining air in the water, and spraying the resulting water-entrained air mixture into the atmosphere.

5. The method of aerating water according to claim 4 wherein the spraying step is further characterized by spraying the water-entrained air mixture into the atmosphere immediately as it passes through the last converging section in the series.

6. The method of aerating water according to claim 5 wherein the forcing step is further characterized by directing a stream of water through a plurality of cup-shaped sections each of which converges in the direction of movement of the stream.

7. A method of maximizing the discharge distance of a liquid stream including the steps of:

forcing a liquid stream under pressure through a sequence of venturi-forming members each open to a gaseous environment entraining gas in the stream, and discharging the liquid stream from the last venturiforming member in the sequence directly into the gaseous environment.

8. The discharge distance maximizing method according to claim 7 wherein the liquid stream forcing step is carried out by directing a liquid stream through a series of convergent sections each having a large end that is open to the gaseous environment.

9. The discharge distance maximizing method according to claim 8 wherein the liquid forcing step is carried out by directing a liquid stream through a plurality of convergent sections all of which converge in the same direction.

10. The discharge distance maximizing method according to claim 9 wherein the liquid stream forcing step is carried out by directing a stream of water through approximately six cup-shaped members each open to the atmosphere and wherein the liquid stream discharging step is carried out by discharging the water out of the last cup-shaped member into the atmosphere.

* * * * *

UNITED STATES PATENT OFFICE
CERTIFICATE OF CORRECTION

Patent No. 3,853,271　　　　　　　　Dated December 10, 1974

Inventor(s) Kenneth D. Freshour; John C. Vay Dyk, deceased

It is certified that error appears in the above-identified patent and that said Letters Patent are hereby corrected as shown below:

Abstract, line 7, "ventrui" should be --venturi--.

Abstract, line 7, after "air" insert --both--.

Claim 1, line 13, before "convergent" change "and" to --the--.

Claim 7, lines 20 and 21, "venturiforming" should be
　　　--venturi-forming--.

Signed and sealed this 4th day of March 1975.

(SEAL)
Attest:

RUTH C. MASON
Attesting Officer

C. MARSHALL DANN
Commissioner of Patents
and Trademarks